United States Patent
Latall

[11] 3,739,089
[45] June 12, 1973

[54] APPARATUS FOR AND METHOD OF LOCATING LEAKS IN A PIPE

[75] Inventor: Roy C. Latall, Des Plaines, Ill.
[73] Assignee: Conco Inc., Mendota, Ill.
[22] Filed: Nov. 30, 1970
[21] Appl. No.: 93,610

[52] U.S. Cl. .......................... 178/6.8, 178/DIG. 1
[51] Int. Cl. .............................................. H04n 7/18
[58] Field of Search....................... 178/DIG. 1, 6.8; 138/97; 356/241; 128/4, 6; 350/138, 139, 153, 165, 166, 168, 171, 172

[56] References Cited
UNITED STATES PATENTS

| | | | |
|---|---|---|---|
| 2,971,259 | 2/1961 | Haitnau | 178/DIG. 1 |
| 3,090,378 | 5/1963 | Sheldon | 128/4 |
| 2,053,196 | 9/1936 | Kitroser | 356/3 |
| 3,426,146 | 2/1969 | Seaman | 178/DIG. 1 |
| 2,780,956 | 2/1957 | Fuller | 356/165 |
| 3,450,481 | 6/1969 | Kramp | 356/241 |

FOREIGN PATENTS OR APPLICATIONS
1,043,366 9/1966 Great Britain ....................... 336/241

*Primary Examiner*—Robert L. Griffin
*Assistant Examiner*—Joseph A. Orsino, Jr.
*Attorney*—Hofgren, Wegner, Allen, Stellman & McCord

[57] ABSTRACT

An apparatus for locating leaks in a pipe, such as a sewer pipe, wherein a viewing device such as a television camera is moved longitudinally through the pipe. The image seen by the camera is displayed on a television receiver. The camera utilizes a relatively long focal length lens so that only a short length of pipe is sharply in focus at each position of the camera. Means are provided for indicating the location of the camera as it is moved along the pipe so that when a leak is found, the location of the camera and corresponding, the location of the leak are accurately indicated to the user. The apparatus utilizes only the image of the pipe and the leak itself for locating the leak.

10 Claims, 3 Drawing Figures

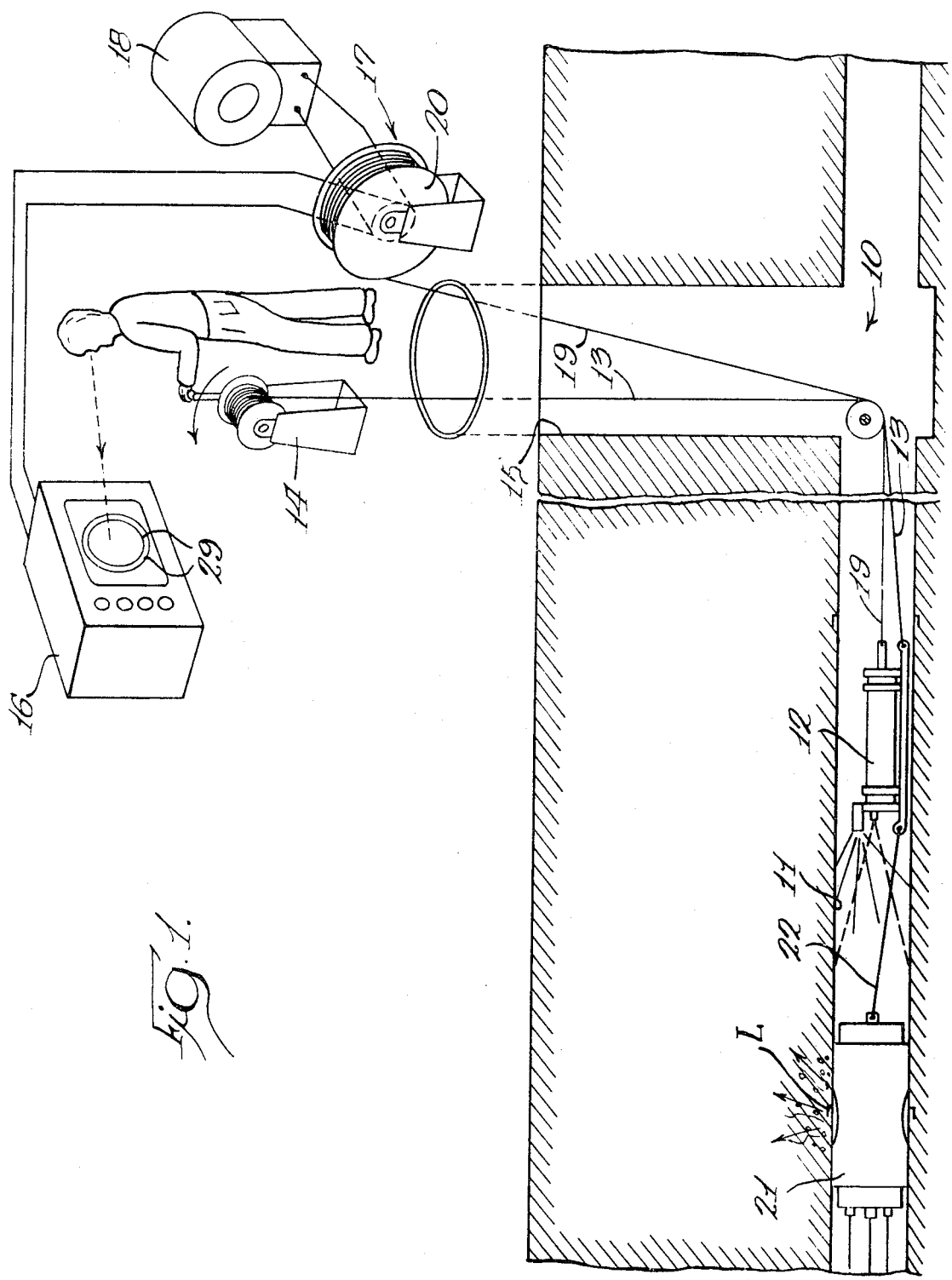

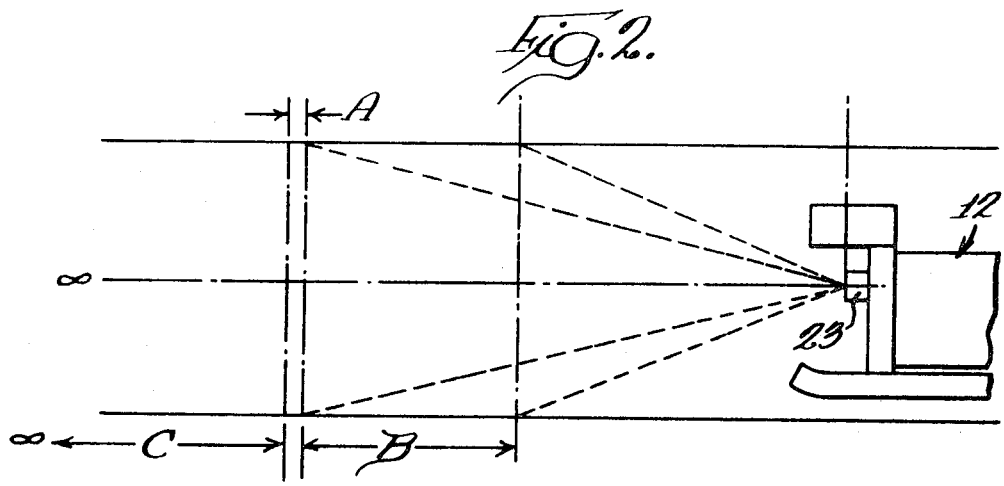
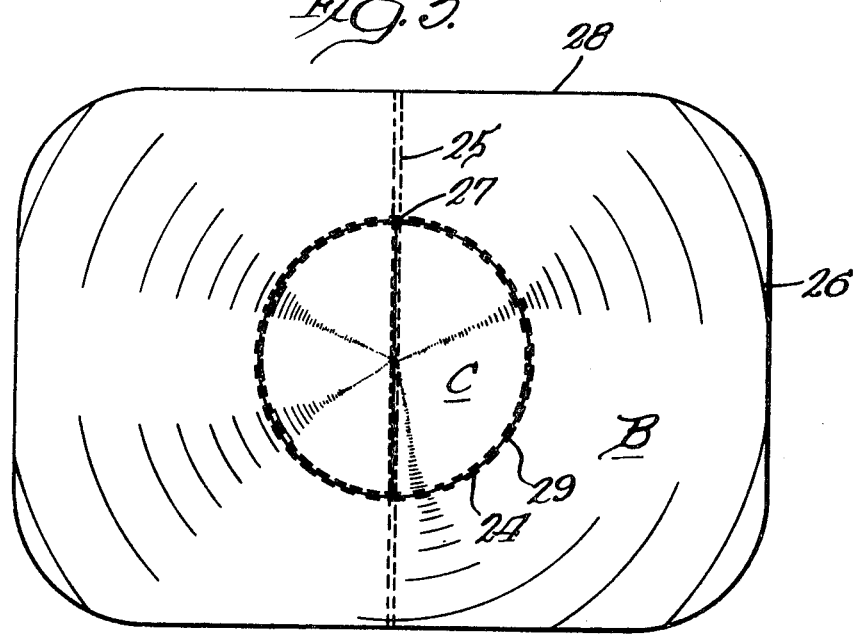

APPARATUS FOR AND METHOD OF LOCATING LEAKS IN A PIPE

BACKGROUND OF THE INVENTION

1. Field of the Invention

This invention relates to apparatus for locating leaks in pipes, and more specifically relates to such apparatus using viewing devices for movably scanning the interior of the pipe.

2. Description of the Prior Art

In one well known form of sewer pipe leak locating apparatus, a television camera is moved longitudinally through a pipe so as to provide an image of a target element spaced accurately a preselected distance in front of the camera. The target conventionally comprises a ball which, as a result of impingement of water on the ball at the leak, provides an indication thereof through the television transmitting system. Such apparatus requires that the ball be maintained accurately at the fixed spacing from the camera and any change in this spacing can result in an improper location of the leak.

Conventionally, a grouting device is provided with the leak loacting device so that the leak is automatically sealed by suitable operation of the grouting device based on the information provided by the leak locating device. Thus, where the target is inadvertently spaced wrongly from the camera, a grouting of the pipe may be effected at an incorrect location so that while the user believes that the leak has been properly stopped, it may, in fact, have been completely missed by the grouting device.

Further, such target devices may catch on irregularities in the pipe, making more difficult the use of the leak locating apparatus. Leak locating devices using such target means are shown in United States Letters Patent No. 3,168,909 issued to J.A. Zurbrigen et al. for a "Method for Locating and Sealing Pipe Leaks" on Feb. 9, 1965 and 2,971,259 issued to R. F. Hahnau et al. for a "Method and Apparatus for Determining the Position of Sewer Leaks" on Feb. 14, 1961.

SUMMARY OF THE INVENTION

The present invention comprehends an improved apparatus for locating leaks in a pipe eliminating the disadvantages of the above discussed conventional apparatuses in a novel and simple manner.

More specifically, the present invention comprehends the provision of such an apparatus which eliminates the target means of the known apparatuses and substitutes a positive optical focusing and identification means. Thus, the apparatus is extremely simple and economical of construction while providing a number of highly desirable advantages over the apparatuses of the prior art.

The present apparatus utilizes a suitable preselected focal lens in the television camera so as to provide a sharp, preselected small depth-of-field image of the interior of the pipe being scanned at a preselected distance from the lens whereby a leak may be sharply displayed only when the lens is accurately at the preselected distance. Thus, the present apparatus utilizes only the pipe structure and leak itself for providing the location determining information.

To facilitate accurate determination of the leak location, the television receiver may be provided with a suitable marking corresponding to the configuration of the pipe in the sharply defined portion of the image. The camera lens may be positioned coaxially of the pipe as it is moved longitudinally therealong and, thus, the image of the in-focus portion of the interior wall surface of the pipe is a circle. More specifically, the images of the joints of the pipe clearly define readily discernible circles wherefrom most leaks normally originate. The indicium means on the receiver may correspondingly comprise a circle having a diameter accurately corresponding to the displayed image circle of the sharply defined portion of the pipe.

Where the apparatus is intended for use with pipes of different diameters, correspondingly different diameter circles may be provided in the receiver viewing means for providing corresponding indicia means suitable for use with the different diameter pipes.

BRIEF DESCRIPTION OF THE DRAWING

Other features and advantages of the invention will be apparent from the following description taken in connection with the accompanying drawing wherein:

FIG. 1 is a schematic view illustrating the arrangement of the apparatus embodying the invention for locating leaks in a pipe;

FIG. 2 is a diagrammatic diametric section of the pipe scanning means; and

FIG. 3 is a front view of the display means.

DESCRIPTION OF THE PREFERRED EMBODIMENT

In the exemplary embodiment of the invention as disclosed in the drawing, an apparatus generally designated 10 is provided for locating leaks L in a pipe, such as a sewer pipe, 11. The apparatus includes a viewing, or scanning, device generally designated 12 herein comprising a television camera and suitable cable means generally designated 13 for drawing the camera longitudinally through the pipe to progressively scan the length thereof. The television camera is drawn through the pipe by suitable means such as a winch 14 with the cables being brought from the pipe 11 upwardly through a suitable manhole 15. A monitoring television receiver generally designated 16 is provided at ground level for observation by the user in determining the location of the leaks in the pipe. Camera 12 and receiver 16 may comprise portions of a closed circuit television system generally designated 17 which may further include a suitable generator 18 and a transmitting cable 19 which may be paid out from and wound up on a suitable reel 20 to follow the movement of the camera 12 through the pipe.

As desired, a conventional grouting device generally designated 21 may be further carried with the camera 12 by means of a connecting cable 22 for grouting each leak L as it is found. More specifically, the television system 17 provides suitable information for accurately locating the leak as a result of the scanning thereof by the television camera 12 and permits the user to effect further movement of the camera and grouting device through the pipe to accurately position the grouting device at the previously located leak to effect an accurately located grouting of the leak as shown in FIG. 1.

To permit the elimination of the conventional target device associated with the television camera in the known apparatuses as discussed above, television camera 12 is provided with an effectively long focal length lens, such as a 12.5 mm focal length lens utilized with a small indicium pickup tube, for use in scanning pipes, such as sewer pipes ranging in size from approximately 6 inches to 30 inches. With such a lens, the depth-of-field of the sharply focused image of the interior wall surface of the pipe is small and, illustratively, may be less than approximately 4 inches. Thus, as illustrated in FIG. 2, the depth-of-field may define a relatively narrow band A of the interior wall surface of the pipe accurately located at a preselected distance D, such as approximately 17 inches from the lens 23 of the camera 12. The portion of the interior wall surface of the pipe scanned by the lens 23 forwardly of band, or zone, A, such as joint portion B of the pipe, is out of focus and the portion rearwardly of zone A, such as portion C, is similarly out of focus. Thus, only when the leak is positioned at a distance approximately D from lens 23 will the leak be sharply in focus. At the same time, the band A of the pipe will similarly be in sharp focus.

The resultant display of this condition is shown in FIG. 3 wherein the televised image 24 of pipe band A appears as a relatively clearly defined circle. Portions of the interior wall surface of the pipe in zone B appear outwardly of the circle 24 and portions of the pipe rearwardly of the band A appear inwardly of the circle 24.

Thus, as the camera is moved longitudinally through the pipe, i.e. to the right as seen in FIG. 1, the stream, or series or droplets, 25 of leak L is first discerned as out of focus, relatively large, indistinct shape extending downwardly the entire height of the receiver screen 26. However, as the camera moves further away from the leak, the point of origin of the leak 27 at the top of the pipe image moves downwardly to the top 28 of the screen. At the same time that the stream becomes sharply focused, i.e. it becomes spaced from the lens 23 the spacing D, the point of origin 27 moves further downwardly to appear at the top of the sharply defined circle 24 comprising the image of the sharply focused pipe band A. Thus, not only is there a sudden change in the sharpness of the leak, but also, there is a positive indication of the spacing of the lens 23 from the leak by the distance D by the correlation of the position of the top of the leak 27 at the image circle 24.

Should the television camera inadvertently be moved further away from the leak, not only will the image of the leak again become unfocused, but also the top of the stream, or droplet series, will be displaced below the top of the circle 24 as the circle 24 now represents the new band A forwardly of the band in which the leak is located. Thus, the location of the top of the line of leak on the screen 26 accurately assists the user in the location of the leak by augmenting the determination made by the brining of the leak into sharp focus at the distance D.

It has been found that a further facilitation of the determination of the leak location may be effected by providing in associating with screen 26 an indicium, or reference point, such as the top 28 of the receiver screen, or a suitable mark 29, herein comprising a circle which accurately corresponds to the diameter of the image of the interior of the pipe at the distance D from lens 23. By use of the reference circle 29, need for ascertaining the sharpness of the leak to indicate the spacing D is obviated. All that the user need do is to ascertain the point at which the camera is positioned when the leak origin 27 is accurately disposed in correspondence with the top of circle 29, or similarly when the length of the leak is accurately equal to the diameter of the reference circle.

Apparatus 10 is further adapted for use in determining the location of leaks in different diameter pipes in conjunction with the use of the reference circle 29 by the provision of different diameter circles 29 as shown in FIG. 1, corresponding to the different diameter pipes with which the apparatus is to be used. The reference circles may be provided directly on the receiver screen or may be provided on suitable transparent sheets. Thus, a series of different sheets, each with a single, suitable reference circle provided therein, may be utilized selectively for correspondence with the different size pipes to be scanned. Alternatively, a single circle may be used on the receiver with the lens system being suitably changed for different size pipes to produce the same size image on the screen 26 for each different size pipe.

In use, the determination of the leak location may be suitably recorded for grouting by a subsequent introduction of grouting apparatus into the pipe as practiced in one conventional method of pipe leak repair. In illustrating the invention, a grouting device has been shown in association with the camera so that once the location of a leak is determined, the cable 13 may be drawn forwardly a preselected distance corresponding to the spacing of the attached grouting device from the television camera so that the grouting device may be immediately accurately located at the leak for effecting the repair thereof. Any suitable method of utilizing the information provided by the leak locating means of the present invention may be utilized therewith in effecting the repair of the leak within the scope of the invention.

Thus, the present invention comprehends an improved apparatus for facilitated location of leaks in underground pipes permitting facilitated repair thereof. The improved, simplified apparatus of the present invention provides for reduced cost and maintenance while yet providing an improved accurate leak location determination.

The foregoing disclosure of specific embodiments is illustrative of the broad inventive concepts comprehended by the invention.

I claim:

1. In an apparatus for locating leaks in a pipe including a viewing device for providing an image, means for variably locating the viewing device in the pipe, means for indicating the location of the viewing device in the pipe, and means for displaying the image provided by said viewing device, means for accurately locating the viewing device relative to a leak in the pipe comprising focusing means associated with the viewing device for providing a sharp, preselected small depth-of-field focused image of a narrow portion of the interior of the pipe at a preselected distance from the focusing means whereby a leak may be sharply displayed only when the viewing device is accurately at said preselected distance therefrom to coincide with the sharp image of the focused pipe portion, said depth of field being less than approximately 4 inches.

2. The leak locating apparatus of claim 1 wherein said focusing means comprises an effectively long focal length lens.

3. The leak locating apparatus of claim 1 wherein the pipe is circular, the viewing device is arranged to view the pipe from the axis thereof, and said means for accurately indicating said condition comprises a circle on the displaying means corresponding accurately to the circular shape of the sharp limited depth-of-field image of the interior surface of the pipe interior wall surface at said preselected distance from said lens.

4. The leak locating apparatus of claim 1 further including means associated with said displaying means for accurately indicating the condition wherein the image of the leak extends downwardly from the top of the sharp limited depth-of-field image of the pipe interior wall surface.

5. The leak locating apparatus of claim 4 wherein said means for accurately indicating said condition comprises a marking on the displaying means corresponding accurately to the top of said sharp limited depth-of-field image.

6. The leak locating apparatus of claim 4 wherein said means for accurately indicating said condition comprises a closed line on the displaying means corresponding accurately to the shape of the sharp limited depth-of-field image of the interior surface of the pipe interior wall surface at said preselected distance from said lens.

7. In an apparatus for locating leaks in a pipe including a television camera for providing an image, means for variably locating the camera in the pipe, means for indicating the location of the camera in the pipe, and a television receiver for displaying the image provided by said camera, means for accurately locating the camera relative to a leak in the pipe comprising: a long focal length lens in said television camera for providing a sharp, preselected small depth-of-field focused image of a narrow portion of the interior of the pipe at a preselected distance from the lens whereby a leak may be sharply displayed by said receiver only when the camera lens is accurately at said preselected distance therefrom to coincide with the sharp image of the focused pipe portion, said depth of field being less than approximately 4 inches; and indicium means on said receiver for indicating when a leak viewed by the camera originates at a point in said pipe spaced from said lens accurately said preselected distance.

8. The leak locating apparatus of claim 7 wherein said pipe is circular, said lens is carried by said television camera to be axially centered in the pipe, and said indicium means comprises a circle displayed on the receiver to be viewed concurrently with the displayed image for accurately identifying in the image the sharply focused circular zone of the pipe interior wall surface.

9. The leak locating apparatus of claim 7 wherein said indicium means comprises a plurality of different size concentric circles displayed on the receiver for use in identifying images with corresponding different diameter pipes.

10. The method of locating a leak in a pipe comprising the steps of: movably scanning progressively lengthwise of a pipe, successive narrow, sharply-focused, transverse cross-sections of the interior of the pipe; providing information as to the scanning position when the sharply-focused narrow cross-section of the interior of the pipe is that in which a leak is disposed; providing an image of the scanned sharply focused leak on a display; and comparing the image on the display to a reference indicium associated with the display to facilitate determination of the scanning position wherein the leak is disposed in said narrow, sharply-focused scanned cross section of the interior of the pipe.

* * * * *